United States Patent [19]
Florjancic

[11] 3,722,315
[45] Mar. 27, 1973

[54] HIGH FORCE WITHSTANDING JOINT

[76] Inventor: Peter Florjancic, St. Martinstr. 12, Garmisch-Partenkirchen, Germany

[22] Filed: Apr. 7, 1971

[21] Appl. No.: 132,148

[30] Foreign Application Priority Data

Apr. 24, 1970 Austria..............................A 3787/70

[52] U.S. Cl. .......................74/520, 74/470, 287/94, 425/450
[51] Int. Cl. ................................................G05g 1/04
[58] Field of Search ..18/30 LV, 30 LT; 74/469, 520, 74/470; 287/93, 94; 425/450

[56] References Cited

UNITED STATES PATENTS 2,186,030   1/1940   Lester....................................74/520

*Primary Examiner*—Milton Kaufman
*Attorney*—Bryan, Parmelee, Johnson & Bollinger

[57] ABSTRACT

An improved joint linkage capable of withstanding high forces applied thereto having two pairs of contact surfaces; the first pair of contact surfaces being constructed in such a manner as to be capable of withstanding forces of a small magnitude only and adapted for guiding hinged members in their pivotal movement relative to one another; the second pair of contact surfaces being capable of withstanding comparatively high forces and being operable to do so only when the hinged members are at rest longitudinally relative to one another. A predetermined degree of movement in a direction radial to the joint axis is permitted. The improved joint finds particular application in injection molding closure devices utilizing hinged brace members for transmitting extremely high closing forces.

3 Claims, 3 Drawing Figures

HIGH FORCE WITHSTANDING JOINT

BACKGROUND OF THE INVENTION

This invention relates to a hinge connection and in particular to a joint connection finding utility in a force transmitting member of the type used in closure devices for injection molding machines and the like. More specifically the invention is directed to a pivoting force transmitting mechanism hinge connection having two parts movable relative to one another which are subject to a slight force only during their pivoting movement but to a relatively strong force when in a position of rest and force transmission.

In injection molding machines split-half mold forms defining the article to be produced are tightly pressed together while the molding material or the like is injected into the cavity defined by their joinder, and disengaged while the finished molded article is being removed. Generally the mold halves are clamped to closure plates one of which is in a fixed position while the other is movable relative thereto. During the injection molding operation the movable closure plate must press the movable mold half against the fixed mold half and its closure plate with a force of sufficient magnitude to withstand the high injection molding cycle pressures generated. Furthermore, after the injection molding cycle is completed the movable closure plate must withdraw the movable mold half so that the finished article may be removed.

In injection molding machines the required high closing force is generated hydraulically and transmitted to the movable closure plate by means of a force transmitting member or device such as a lever system. This lever system may take the form of an elbow lever mechanism or a hinged swinging-arm mechanism, each of which utilizes hinged or swivel connections. However, prior art hinge connections cannot be subjected to the required high closing forces without risk of damage due to deformation or even destruction of the joint. Despite these drawbacks and the need for strength, however, the lever mechanisms are preferred because they desirably take up little space, experience little friction and are relatively simple to fabricate. The present invention overcomes the limitations associated with the prior art hinge connections and provides a simple efficient and compact lever mechanism which is able to withstand the high closing forces.

SUMMARY OF THE INVENTION

In a force transmitting member of a closure device used for closing of an injection mold, a hinge connection or linkage in accordance with the invention having a first pair of contact surfaces which serves for the guidance of parts during a pivoting movement, and a second pair of contact surfaces which serves for the transmission of high force during the time when the parts are in position to transmit force and move a closure plate for closing the mold. Additionally, limited movement of the two pivoting parts radially to the axis of rotation of the hinge or pivot is permitted.

The construction of the invention replaces the conventional pin or stud which normally forms the bearing of a hinge or pivot connection and transmits forces applied to the hinged members with two pairs of contact surfaces. One pair of contact surfaces secures the parts during pivoting rotation, when the friction is slight and exposure is to a small force only, while the other pair serves exclusively for the transmission of a large force. The first pair of contact surfaces, due to their limited exposure to force, may be comparatively small and of less strength than the second pair of surfaces which, since they need not come into frictional sliding engagement with one another as the first, may be made relatively larger. Movement in a direction radial or transverse to the axis of the hinge is permitted so that, upon application of the high closing force transmitted thereto, the hinge surfaces which serve merely for guidance of the pivoting movement are not subjected to the high force but rather, allow the second pair of contact surfaces, normally in close but separated juxtaposition, to engage one another.

It is an object of this invention, therefore, to provide a lever mechanism having two parts connected by a hinge linkage wherein the hinge pin is not subjected to high forces transmitted through the lever parts when the parts extend in a longitudinal direction.

A further object of the invention is to provide a hinged lever mechanism capable of transmitting high forces therethrough without deformation or destruction of the parts thereof.

A further feature of this invention is the provision of an elastically deformable hinge which permits movement transverse to the axis of the hinge. Upon application of high force longitudinally to the hinged parts and transversely to the hinge, a hinge pin will be displaced sufficiently to permit the forces to be transmitted through contact surfaces adjacent to the pin rather than through the pin itself. The spring action of this hinge is selected such that it is relatively stiff with respect to the forces that occur during the pivoting movement and responds similarly to the action of a rigid bearing but that under high force it yields sufficiently to permit the pair of contact surfaces that serve for transmission of the high force to make good face-to-face contact. While the same could be accomplished by providing a correspondingly larger bearing play in the hinge, using a deformable element results in the avoidance of shocks while allowing more accurate pivoting movement.

Another feature of this invention, therefore, is the provision of a high force transmitting mechanism hinge linkage which is relatively compact, simple to construct and efficient in operation, yet which is capable of transmitting high forces without deformation or destruction of any of its operating parts. The improved hinge connection according to this invention finds particular utility in the mold closure devices employed with conventional injection molding machines.

The above and other objects, features and advantages of this invention will become apparent and be better understood from the following description of various embodiments of the invention taken in conjunction with the accompanying drawings.

DESCRIPTION OF THE PREFERRED EMBODIMENTS

Figure 1:
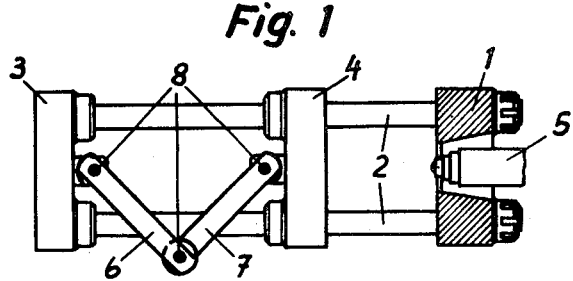
FIG. 1 is a side elevational view, partly in section, of an elbow lever mechanism and closure plate in which the closure plate is shown in a partially open position.
Figure 2:
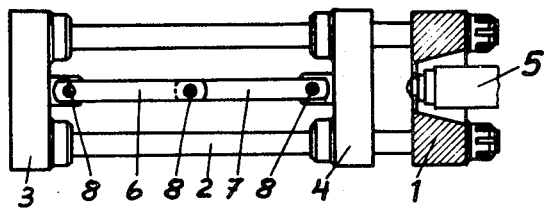
FIG. 2 is a view similar to FIG. 1 showing the closure plate in a fully closed position.

Referring to FIGS. 1 and 2 in greater detail, there is schematically shown an embodiment of a closure device utilizing an improved lever and linkage mechanism according to this invention. Mold halves (not shown) are attached to a fixed closure plate 1 and a movable closure plate 4 by means such as clamping. The closure plate 4 is movably mounted on the guide rods 2 while the fixed closure plate 1 is connected to a hydraulic pressure cylinder (not shown) by the guide rods 2. A cross bar 3 is fixed to a piston in the hydraulic pressure cylinder and is also movably mounted on the guide rods 2. Molding material is introduced to the mold cavities through an injection head 5.

In the embodiment shown in FIGS. 1 and 2 the cross bar 3 and the movable closure plate 4 are connected by an elbow-joint lever mechanism having two portions 6 and 7 and a total of three joint connections 8. To cause the closure plate 4 to advance toward the fixed closure plate 1 thereby closing the mold (FIG. 1) the elbow-joint is extended by a mechanism (not shown) which causes the joint connections to pivot. When the mold is at least substantially closed the lever portions 6 and 7 form a straight brace normal to cross bar 3 and closure plate 4. The cross bar 3 is then hydraulically actuated with great force in a direction toward the fixed closure plate 1 and injection head 5. This force is transmitted longitudinally through the lever portions 6 and 7 and the respective joint connections 8 to the movable closure plate 4 in such a manner (FIG. 2) that the joint connections 8 do not make any pivoting movements.

Figure 3:
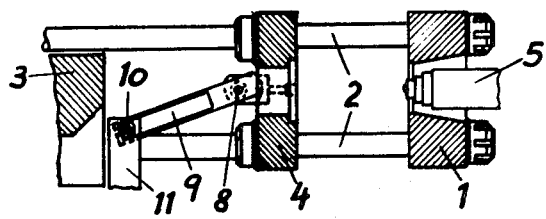
FIG. 3 is a side elevational view, partly in section, of a hinged arm mechanism and closure plate with the closure plate in a partially open position.

FIG. 3 shows another embodiment according to the invention wherein the force transmitting member is in the form of a brace or arm 9 rather than an elbow-joint. Upon closing of the mold and movement of the closure plate 4 toward the fixed closure plate 1 the arm member 9 is swung upward while pivoting on the joint connection 8 and is lifted into the axis of the closure device by the roller 10 which glides in a track portion of the hinged arm 9 and is rotatably secured to rod 11. When the mold is substantially closed the free end of arm member 9 rests against cross bar 3 forming a brace and the high force of cross-member 3 is transmitted through arm member 9 and the joint connection 8 to the closure plate 4.

Figure 4:
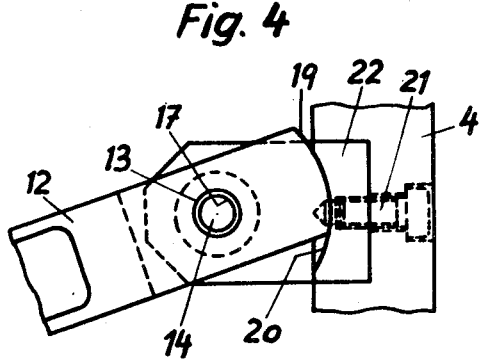
FIG. 4 is an enlarged side elevational view of the hinge joint connection of the embodiment shown in FIG. 3.
Figure 5:
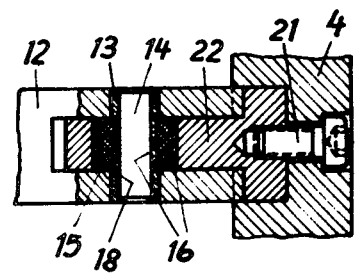
FIG. 5 is a top cross sectional view of the hinge joint connection shown in side elevation in FIG. 4.

FIGS. 4 and 5 show in greater detail the joint connection employed in the embodiment of FIG. 3, which joint connection is also illustrative of the type used in the embodiment according to FIGS. 1 and 2.

As is apparent from FIGS. 4 and 5, this joint connection is not a conventional simple hinge linkage since the hinge pin would have to be extremely large due to the high bending tensions it would undergo when the high closing force would be transmitted through the member. Referring to FIG. 5, it is seen that one portion of the joint is forked, identified as the portion 12, forming a part of the force transmitting arm member 9. Each of the prongs of the fork has a bore hole therein containing pressure-fit bearing bushings 13. A second portion of the movable joint consists of the male part 22 which forms a complementary engagement with the female portion defined by the fork prongs. This male portion 22 is secured to the movable closure plate 4 by means of a screw 21. The male portion 22 has a bore hole therein which will align with the bore holes of the prongs of the fork portion 12. The male portion bore hole contains as a bushing a rubber elastic element having a hollow cylindrical body 15 made of rubber vulcanized in between two concentric reinforcing rings 16. A pin 14 is attached in the bore of the male portion 22 by means of this rubber elastic element rather than being fixed in the bore holes of the fork prongs.

The surface of the pin 14 and the inner surface 18 of the bearing bushings 13 form a friction bearing and a first pair of contact surfaces which is suitable to guide part 12 of arm 9 during its rotating movement. The friction between this pair of contact surfaces is comparatively small due to the relatively small diameter of the pin 14. However, since transmission of the extremely large force generated by the cross bar 3 through the rubber element 15 would not be possible without destruction thereof, a second set of contact surfaces is provided.

One of this pair of force transmission contact surfaces is formed by the circularly curved ends of the two prongs of the fork part 12 which are concentric with the turning axis of the pin 14 and is shown at 19. The other contact surface 20 (FIG. 4) is formed by circularly curved recessed shoulder portions in the male part 22 and is complementary to surface 19. Contact surfaces 19 and 20 are considerably larger and stronger than the contact surfaces 17 and 18 and are thus able to withstand considerably greater forces. The resilience and elasticity of the rubber element 15 allows slight movement in a direction radial to the hinge turning axis and permits the surfaces 19 and 20 to come into full engagement and contact upon the longitudinal application of the high closing forces to the arm member 9 without overloading the surfaces 17 and 18. In its relaxed or non-compressed state, the elastic element 15 has a thickness such that the second pair of contact surfaces do not engage one another, for example, as during pivoting movement.

Variations of the hinge connections are possible according to this invention. For example, the joint need not be formed by a pin and fork portion but alternatively, may consist of a ball bearing operating in a socket. Moreover, as an alternative to an elastic bearing element a slight clearance may be provided in the construction of the high force transmitting contact surfaces. Additionally, these surfaces need not be cylindrical but may also be constructed in a ball or cone shape to effect lateral centering. Furthermore, the high force transmitting contact surfaces need not be absolutely concentric with the pivot axis of the joint but may be displaced laterally somewhat. If located exclusively to one side of the center line they may be level. In either situation, however, their mutual distance increases when pivoted out from the high force position.

There has been provided, therefore, an improved hinge connection capable of withstanding high forces without deformation or destruction and particularly suitable for use in closure devices for injection molding machines which utilize pivoted force transmitting members.

What is claimed is:

1. A joint connection adapted for use with hinged force transmitting members of the type normally employed in closure devices for injection molding machines and the like, comprising:

two members movably hinged together and subject to externally applied forces of differing magnitude depending upon whether the hinged members are undergoing pivoting movement or are in a position of rest and force transmission, a first pair of contact surfaces that serves for guiding the members during pivoting movement, a second pair of contact surfaces that serves for transmitting a force through the members when in a position of rest and force transmission, said first pair of contact surfaces being capable of withstanding only a force of small magnitude compared to said second pair of contact surfaces, and at least one said first pair of contact surfaces being provided with an elastic element means thereon, and said second pair of contact surfaces being so associated together with said first pair of contact surfaces such that a slight degree of movement in a direction radial to the turning axis of the joint is permissible under predetermined conditions.

2. A joint connection adapted for use with hinged force transmitting members of the type normally employed in closure devices for injection molding machines and the like, comprising:

two members movably hinged together and subject to externally applied forces of differing magnitude depending upon whether the hinged members are undergoing pivoting movement or are in a position of rest and force transmission, a first pair of contact surfaces formed by a pin and a friction bearing means around this pin serving for guiding the members during pivoting movement, a second pair of contact surfaces that serves for transmitting a force through the members when in a position of rest and force transmission, said first pair of contact surfaces being capable of withstanding only a force of small magnitude compared to said second pair of contact surfaces, said friction bearing means comprising an elastic bushing element which in its relaxed condition is of sufficient thickness to provide adequate clearance to prevent the second pair of contact surfaces from engaging one another during the normal pivoting movement of the joint and which is capable of yielding under a predetermined amount of force to permit movement in the direction radial to the turning axis of the joint and to cause the second pair of contact surfaces to engage one another, whereby said first pair of contact surfaces and said second pair of contact surfaces are associated together in a manner such that application of high force longitudinally to the joint is transmitted through the second pair of contact surfaces.

3. The joint connection as claimed in claim 2, wherein the second pair of contact surfaces is formed by circularly curved surfaces concentric with the turning axis of the joint.

* * * * *